United States Patent [19]

Masserini

[11] Patent Number: 4,915,128
[45] Date of Patent: Apr. 10, 1990

[54] AUTOMATIC CHAMBERED FLAP VALVE FOR CONTROLLING GAS PASSAGE, PARTICULARLY FOR FEEDING TWO-STROKE INTERNAL COMBUSTION ENGINES

[76] Inventor: Massimo Masserini, via A. Manzoni, 61, 24025 Gazzaniga (Bergamo), Italy

[21] Appl. No.: 265,574

[22] Filed: Nov. 1, 1988

[30] Foreign Application Priority Data

Feb. 26, 1988 [IT] Italy .................................. 2912 A/88

[51] Int. Cl.4 ............................................. F16K 15/16
[52] U.S. Cl. .............................. 137/512.15; 137/512.1
[58] Field of Search ......................... 137/512.1, 512.15

[56] References Cited

U.S. PATENT DOCUMENTS

| | | | |
|---|---|---|---|
| 247,857 | 10/1881 | Thompson | 137/512.1 X |
| 1,306,391 | 6/1919 | Romanoff | 137/512.15 |
| 2,408,056 | 9/1946 | Farmer | 137/512.15 |
| 2,496,834 | 2/1950 | Ward | 137/512.15 |
| 2,505,757 | 5/1950 | Dunbar et al. | 137/512.15 X |
| 2,590,976 | 4/1952 | Kalitinsky | 137/512.15 |
| 2,674,091 | 4/1954 | Malick | 137/512.15 X |
| 2,729,939 | 1/1956 | Campbell | 137/512.1 X |
| 2,781,777 | 2/1957 | Oxnam | 137/512.1 X |
| 3,059,625 | 10/1962 | Torre | 137/512.1 X |
| 3,981,276 | 9/1976 | Ernest | 137/512.15 X |
| 4,180,042 | 12/1979 | Lloyd | 137/512.1 X |

*Primary Examiner*—John Rivell
*Attorney, Agent, or Firm*—Steinberg & Raskin

[57] ABSTRACT

This automatic valve for controlling gas passage through ducts, particularly through feed ducts of two-stroke internal combustion engines, is provided with a chamber (4) arranged to determine the opening and closure of slot-shaped flow ports (2A', 2B') by pressure difference; this takes place by the movement away from and towards contact surfaces of only edges which are perpendicular to the direction of flow, using dihedron-shaped flaps of which those edges parallel to the flow graze end walls provided parallel to them to prevent transverse flow seepage. The prevention of such transverse flow seepage is favored by inserting the dihedron-shaped flaps into containing seats which support the sides at said edges parallel to the flow, and which also limit transverse deformation by the pressure on the inside of the dihedron which determines valve closure.

21 Claims, 3 Drawing Sheets

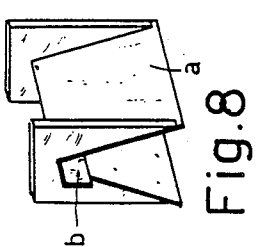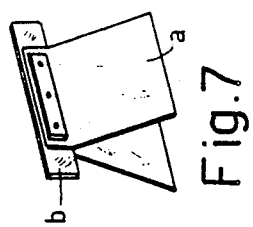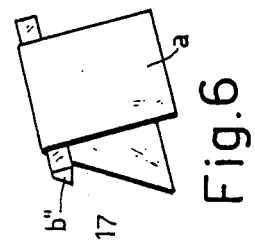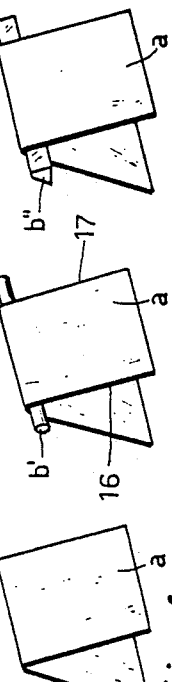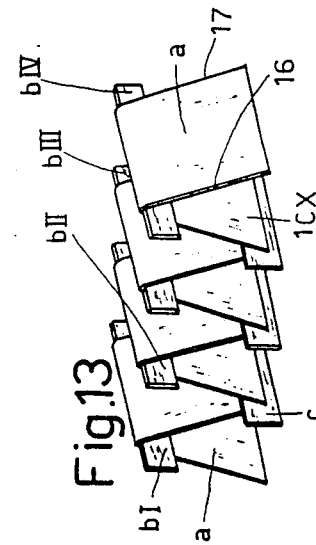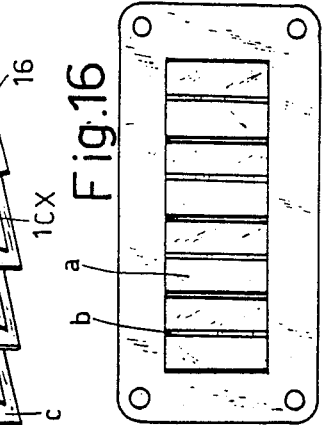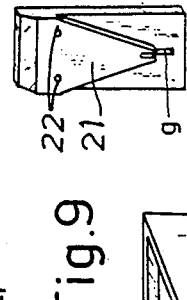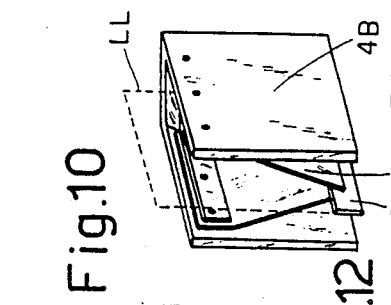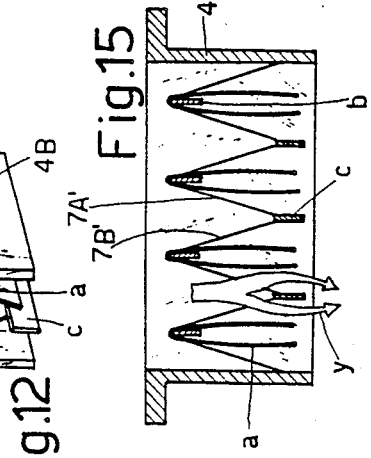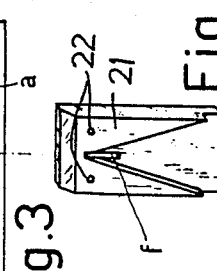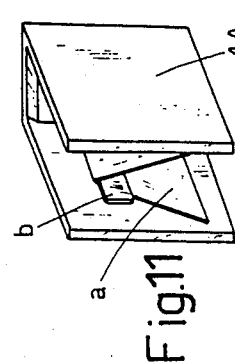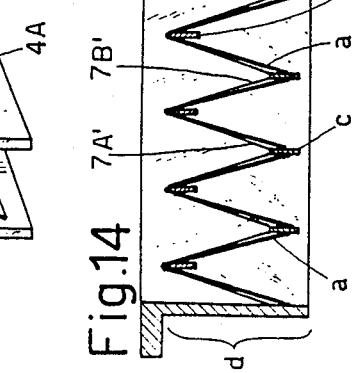

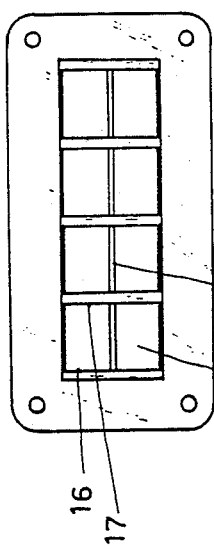
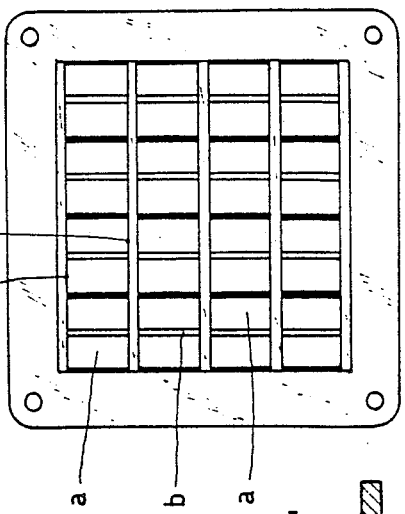
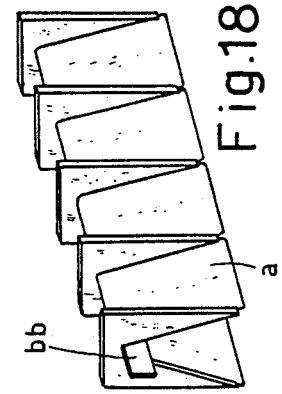
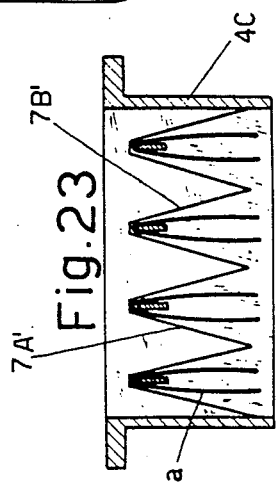
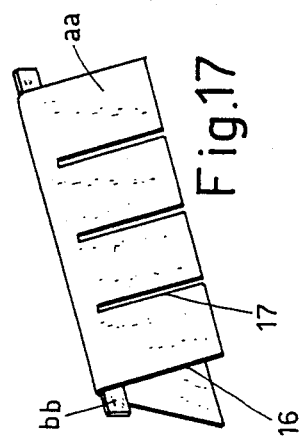
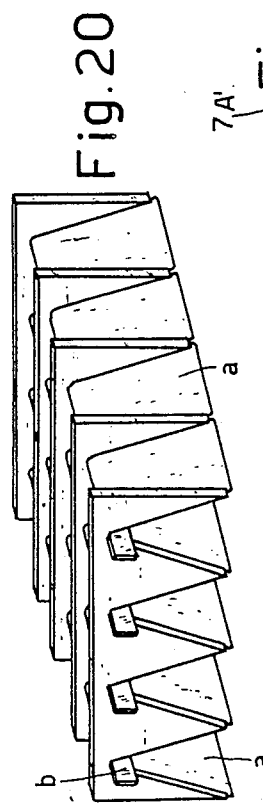
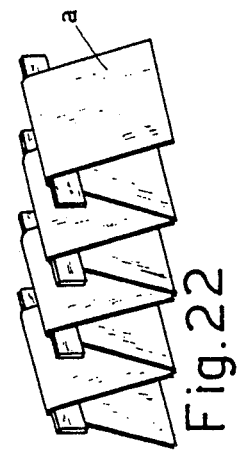

AUTOMATIC CHAMBERED FLAP VALVE FOR CONTROLLING GAS PASSAGE, PARTICULARLY FOR FEEDING TWO-STROKE INTERNAL COMBUSTION ENGINES

BACKGROUND OF THE INVENTION

This invention relates to the field of automatic valves for controlling gas passage through conduits, and in particular to the field of automatic flap valves used in the feed ducts of two-stroke internal combustion engines.

Conventional flap valves are known to consist of an elastic flap adhering tightly to the edge of a hole or port until a gas emerges from the interior of said hole at a pressure which creates a force able to deflect said elastic flap, thus also overcoming any pressure which previously tended to keep the flap adhering to the edge of the hole in order to close it.

In this type of conventional valve an essential role is played by the material and shape of the flap, as the valve operation depends totally on the flap bending resistance.

The pressure difference which can exist between the one and the other side of the flap has influence only during an initial theoretical stage, or only when this pressure is of kinetic order. In this respect, from a static viewpoint as soon as the flap lifts it becomes surrounded by the gas on all sides, and is therefore in contact with only one pressure.

Again, in this conventional type of valve the gas flow undergoes considerable trajectory deviation in passing through it, so that it suffers pressure drops which can be very damaging. In the case of internal combustion engines this pressure drop proportionally reduces the volumetric efficiency. These pressure drops are not only due to the friction deriving from change in trajectory but also due to a multiplicity of irregularities to which the fluid flow is subjected within the duct because of the intrinsic material structures typical of this conventional type of valve.

A further drawback of conventional valves arises because of the need for their flaps to have considerable elasticity and fatigue resistance. This results in high cost deriving from the materials used and the precise machining required to give the flaps the necessary reliability, and also means that these latter must be of considerable weight to satisfy the strength requirements.

In this respect, their weight results in an inertia which prevents the flaps from operating in high frequency fields such as those towards which modern two-stroke engines are tending, this field constituting a sector of useful application for said valves.

SUMMARY OF THE INVENTION

An object of the present invention is to provide a flap valve the opening and closure of which does not depend exclusively on the elasticity of its structure, but also on a pressure action.

A further object is to provide a flap valve which results in flow with low pressure drop.

A further object is to provide a flap valve which can operate with a high frequency of closure-opening cycles.

These and further objects which will be more apparent from the detailed description given hereinafter are attained by an automatic valve for controlling gas passage through ducts, particularly through feed ducts of two-stroke internal combustion engines, which is provided with a chamber arranged to determine the opening and closure of slot-shaped flow ports by pressure difference; this takes place by the movement away from and towards contact surfaces, of only edges which are perpendicular to the direction of flow, using dihedron-shaped flaps of which those edges parallel to the flow graze parallel end walls provided to prevent transverse flow seepage. The prevention of transverse flow seepage is favoured by inserting the dihedron-shaped flaps into containing seats which support the sides at said edges parallel to the flow, and which also limit transverse deformation due to the presence of pressure on the inside of the dihedron which determines valve closure.

BRIEF DESCRIPTION OF THE DRAWINGS

The invention is illustrated by way of non-limiting example on the accompanying drawings, in which:

FIG. 3 shows the rectangular form of the flap before being folded conceptually in half along the indicated axis;

FIG. 4 is a perspective view of a dihedron form obtained by folding the flap of FIG. 3;

FIG. 5 is a perspective view of a dihedron-shaped flap (a) associated with a support b' of round cross-section;

FIG. 6 is a perspective view of a dihedron-shaped flap (a) associated with a support wall b" of essentially triangular section;

FIG. 7 is perspective view of a dihedron-shaped flap consisting of a composition in two parts, which are joined to a common strip b acting as the support wall;

FIG. 8 is a perspective view of a dihedron-shaped flap associated with a strip-type support wall b, and also associated with structures for limiting its movement in the direction which increases the internal angle of the dihedron;

FIG. 9 is a perspective view of a housing f for a strip forming the base support wall for a flap, provided in one of the two housing and support walls required for the edges of a dihedronshaped flap;

FIG. 10 is a perspective view of a housing g for a strip-type wall against which the flap edges which generate the slot-shaped apertures of the valve rest, provided in in one of the two housing and support walls required for the edges of a dihedron-shaped flap;

FIG. 11 is a perspective view of a dihedron-shaped flap associated with a strip-type support wall and inserted into a chamber 4A (tubular piece of square cross-section) from which an end wall of the type shown in FIG. 9 has been removed;

FIG. 12 is a perspective view of a chamber 4B, from which an end wall of the type shown in FIG. 10 has been removed, and within which there operates a valve with central flow slots formed by using flaps which compose a two-part dihedron (such as shown in FIG. 7), but of which each part is supported by being fixed to an integral wall having the same purpose as the strip-type support wall of FIG. 7;

FIG. 13 is a perspective view of the parts of a multiple valve with four dihedron-shaped flaps associated with four strip-type support walls bI, bII, bIII, bIV, and with their free slot-forming edges 1CX bearing elastically against common strip-type contact walls C;

FIG. 14 is a longitudinal section through a multiple-flap valve in its closed position;

FIG. 15 shows the valve of FIG. 14 with its dihedron-shaped flaps deflected from the shape 7A', 7B' represented by their rest housing, to thus provide opening and allow passage of a flow Y between them;

FIG. 16 shows the valve of FIG. 14 from the closure side, showing the vertical arrangement of said four strip-type support walls b;

FIG. 17 is a perspective view of a wide flap aa mounted on a long strip-type support wall bb and provided with four incisions in each side to form four independent flaps;

FIG. 18 is a perspective view of the dihedron-shaped flaps a associated with a long strip-type support wall bb and four end walls of the type shown in FIG. 9, to enable a duct of large width to be served by smaller side-by-side valve elements;

FIG. 19 is a view of a valve comprising the elements of FIG. 18 taken on the closure side and showing the horizontal arrangement of said strip-type support wall bb;

FIG. 20 is a perspective view of a valve structure formed by a side-by-side arrangement of a plurality of elements of the type shown in FIG. 18 and walls having the same purpose as the end walls of FIG. 11 but with multiple housings;

FIG. 21 is a view of a valve comprising the elements of FIG. 20 taken on the closure side, and showing the vertical arrangement of the said strip-type support walls b and the horizontal arrangement of various end walls (FIGS. 9, 10) but with multiple housings;

FIG. 22 shows four dihedron-shaped flaps resting on their own strip-type supports;

FIG. 23 shows the parts of FIG. 22 installed in a duct portion 4C, of which one end wall can be seen shaped with triangular housings (similar to those of FIG. 15) but in which there are no strip-type contact walls C (FIG. 15) for supporting the free edges of the flaps, which therefore in this version rest against each other.

DESCRIPTION OF THE PREFERRED EMBODIMENTS

Figure 1:
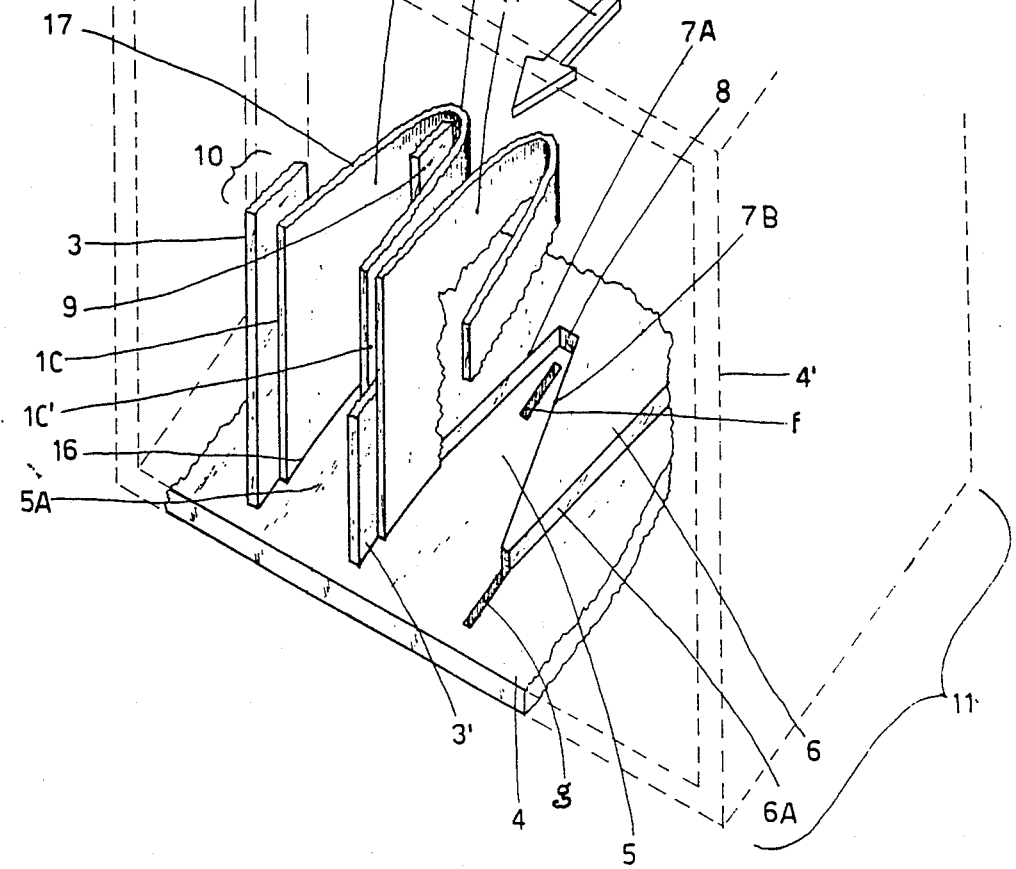
FIG. 1 is a perspective view of certain parts of elements which allow better understanding of the operating principle of the valve and illustrate a structure applicable to a multi-flap valve.

With particular reference to FIG. 1, the flaps 1A, 1A' are of dihedron shape. On the drawing the fold in the dihedron is however replaced by a curve 1B to better show a tapered profile of particular aerodynamic penetration against an air or gas flow moving in the direction indicated by the arrow 2. The flaps can in fact be considered to be folded in the region 1B to form a V-shaped dihedron or profile, as in FIG. 4.

In its basic form the valve represented consists of only one flap, such as 1A, with the outer surface of its ends 1C and 1C' resting against walls 3 and 3' rigid with the fixed or outer body 4.

In an even more basic form, the valve could be constructed with a simple oblique flap, i.e. with a semi-dihedron, i.e. in a form comprising one contact wall C of FIG. 12 extending as indicated by the dashed line LL.

In FIG. 1 the body 4 forms a portion 4" of the duct through which the fluid 2 flows. Said portion 4" has a cross-section 4' in the form of a rectangle of which the element 4 shown on the drawing represents the lower side and acts as an end wall of the type shown in FIGS. 9 and 10. The portion 4" and the rectangular cross-section 4' are represented in thin dashed lines because they are shown merely to indicate their spatial position.

The walls 3 and 3' join the lower end wall 4 to an upper end wall 4''', specularly equal to the wall 4.

Both the wall 4 and the wall 4''' are consequently provided with a recess 5 determined, relatively, by projections 6 having perpendicular walls 6A. On, the drawing the recess is that in which a flap 1A' adjacent to the flap 1A operates, and is identical with that in which said flap 1A operates.

The upper edge 17 and lower edge 16 of said flap 1A therefore graze the flat surfaces 5A forming the end of the recesses 5. This end is delimited by walls similar to the walls 6A, which converge in a triangular plan as indicated by the walls 7A and 7B, or 7A' and 7B' of FIG. 15.

From FIG. 14 it can be seen that the flaps a, shown in thick line, are separated from the walls 7A', 7B' shown in thin line, and it can also be seen that their edges 1C, 1C' rest against the contact walls C.

From a theoretical viewpoint said triangular shape of the recess 5 coincides with the plan view of the dihedron formed by the V configuration of the flaps 1A, because said flaps 1A are contained conjugately within the recess 5 by virtue of their tendency to widen outwards elastically. They thus act outwards in the manner of a flap spring, and return elastically to their closure position as soon as the pressure which has deformed them inwards to allow fluid passage ceases.

Said recess 5 also comprises a central wall 8, and therefore prevents the flap 1A sliding in the opposite direction to that indicated by the arrow 2.

The flap is retained in the direction indicated by the arrow 2 by a specific wall 9 similar to the walls 3 and 3', and which as in the case of these latter join the lower wall 4 to the upper wall 4'''. In FIG. 1 these walls are shown having a width 10, which is as small as is necessary for the operation of a valve comprising a multiplicity of side-by-side flaps 1A, 1A' . . . ; however in an essentially or conceptually basic version, such as that under illustration, the width 10 could coincide with the length 11 of the duct portion constituting the valve body 4.

Figure 2:
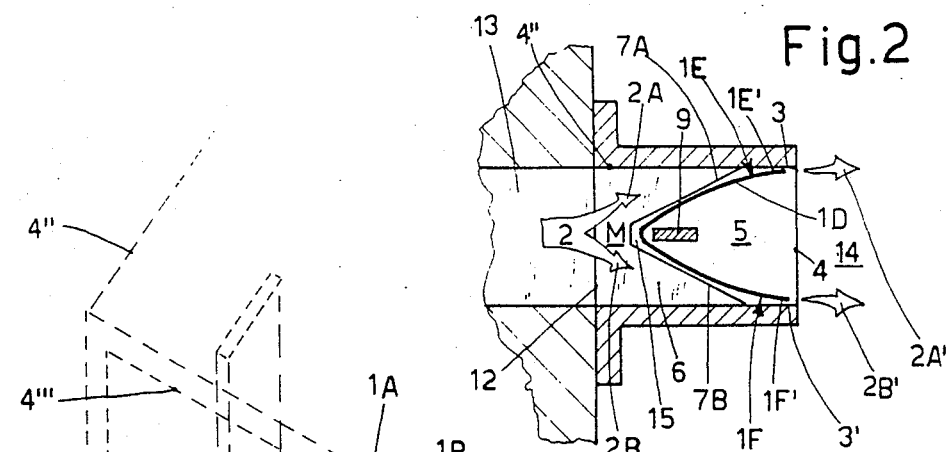
FIG. 2 is a longitudinal section through a single valve dihedron-shaped flap with lateral flow slots.

The valve operation can be described with reference to the sectional view of FIG. 2, in which the various parts are indicated by the same reference numerals as those used to indicate them in FIG. 1.

When the flow in the direction 2 penetrates into a region M upstream of the valve by passing beyond the line 12 which joins it to the rest 13 of the duct, it is divided into two fluid streams 2A and 2B which reach the outer surfaces 1E and 1F of the folded or dihedron-shaped flap. In this manner, said surfaces are urged towards each other in the sense of narrowing their V arrangement, and they consequently separate from the respective walls 3 and 3'. The two fluid streams 2A and 2B therefore reach a region 14 downstream of the valve by the path indicated by the arrows 2A' and 2B'.

During this opening stage, effected by the two constituent surfaces 1E and 1F of the flap, the force overcome by the fluid streams is the intrinsic preload determined by its material and shape, i.e. by its bending resistance. This resistance is however sufficient even if small, because the force for returning the flap to its closure position (during the absence of relative pressure in the upstream region M) is obtained mainly from the presence of relative pressure generated downstream (in the case of use on internal combustion engines).

This means that the flaps can be thinner, less preloaded flexurally and more deformable than those of normal valves. This results in considerable benefits deriving from the reduction in their vibrating mass and thus their ability to operate very rapidly, even at the typical frequencies of high-speed engines.

The flaps being thin also positively influences their fatigue strength, so reducing specific or overall stresses in their material.

Providing a flap in the form of a single dihedron-shaped element also results in practically uniform specific stresses consequent on the freedom of the two surfaces of the dihedron to bend along the most convenient deformation lines. This results in no stress concentration in the fixing regions, typical of all cantilever stresses on fixed beams. This "freedom from restraint" can be deduced from the play indicated by 15 in FIG. 2.

As the surfaces 1E and 1F are pressed elastically against the walls 3 and 3' by way of their ends 1E' and 1F', they are not plane but are curved, their combination forming a highly aerodynamic tapered profile.

Moreover, as their zones of contact with the walls 3 and 3' are practically parallel to them, slot-shaped lead-ins are created considerably facilitating their opening, which thus takes place by an ideal wedging effect.

The flow trajectory is particularly straight and is not subject to lateral or transverse dispersions characteristic of conventional flap valves.

These advantageous properties are attained by the fact that the flaps do not ensure sealed shutoff by the planarity of their surface but by the linearity of their edges.

In this respect, up to now only the seal obtained by the ends 1E' and 1F' has been considered, whereas the edges 16 and 17 also participate in the sealing effect. These edges move transversely to the flow and therefore graze the respective flat surfaces 5A within the recess 5.

This grazing takes place practically without sliding, favoured not only by the small weight of the flaps but also by the parallelism between the upper and lower end edges 16 and 17, and the parallelism between the opposing (upper and lower) surfaces 5A along which they graze.

The pressure tightness deriving from this grazing performs a useful function only during the movement of the flaps. This is because during the closure stage the seal is obtained by the outer surfaces close to said edges 16 and 17 bearing against the walls 6A of the recess 5, the bearing pressure being proportional to the pressure acting on the inside of the dihedron.

With this valve configuration it is apparent that the fluid flow takes place only through slots having a width proportional to the pressure difference between the outside and inside of the dihedron which characterizes the flexible flaps. As these different pressures act in a duct 4 through which a fluid passes intermittently, they are advantageously affected by the kinetic energy generated by the "hammering" created by the cyclic closures. These pressures therefore advantageously result in greater speed of movement of the flaps, i.e. their instantaneous operation which makes them also suitable for very high-speed engines.

As already stated, FIGS. 3 to 23 show a plurality of parts contained in numerous constructional embodiments. All these figures comprise a flexible flap a disposed obliquely and associated with another similar flap to form a dihedron. This flap (indicated by 1 in FIGS. 1 and 2) can be constructed in many ways and of very different materials, from spring steel to the wide range of plastics materials (such as thermoplastic polyesters, PTP, PET, or reinforced or non-reinforced thermosetting plastics). The common requirements for such plastics materials are in all cases good fatigue and bending strength, good mechanical strength at operating temperature (which depends on the application), good chemical resistance to hydrocarbons, low specific gravity and low cost.

Said FIGS. 3 to 23 also show a support wall b (identical to the wall 9 of FIGS. 1 and 2) of strip type, or b' of round crosssection, or b" of triangular cross-section. The support wall b is preferably of metal. It is inserted into its cavities (5 in FIG. 1, f in FIG. 9 and g in FIG. 10) and is then fixed so that it cannot slide axially, for example by welding it into its seats (f, g) or by retaining it by usual blocking plates 21 fixed to the valve body 4 by screws 22.

Said external blocking plates could have a length d (FIG. 14) to also retain possible contact walls c of FIG. 12 (3' in FIG. 1) against which the edges 1C, 1C' of the flaps bear, as these contact walls (c, 3') can be equal to the strip-type support walls b (9 in FIG. 1).

The strip-type support walls b or contact walls c are preferably of metal and have very flat and smooth surfaces.

To summarize, the present invention is directed to a automatic valve for controlling gas passage through ducts, particularly through feed ducts of two-stroke internal combustion engines, which is provided with a chamber arranged to determine the opening (FIG. 15) and closure (FIG. 14) of rectangular slot-shaped flow ports (2A', 2B') by pressure difference by the movement away from and towards contact surfaces c (in FIGS. 12, 13, 14, 15; between flaps a in FIGS. 22, 23) of only edges 1C, 1C'T which are perpendicular to the direction of flow 2, using dihedron-shaped flaps 1A (FIG. 4) of which those edges 16, 17 parallel to the flow 2 graze, when in movement, flat surfaces 5A of recesses 5 provided in end walls (FIGS. 9, 10) parallel to said edges 16, 17, the purpose being to prevent transverse seepage of flow 2.

More specifically, the prevention of the transverse seepage is favored by inserting the dihedron-shaped flaps 1A, 1A' into containing seats 5, 6A, 8 which support the sides at the edges 16, 17 parallel to the flow 2, and which also limit 6A, 7A, 7B the transverse deformation by the pressure on the inside of the dihedron which determines valve closure (FIG. 14). The flaps 1A (FIG. 4) are retained in the seats 4, 5 by strip-type support walls 9, preferably formed of metal. The perpendicular edges 1C, 1C' of the flaps rest against strip-type contact walls 3, 3', c, which are preferably of metal. Preferably, the strip-type support walls 9 are identical to the strip-contact walls 3, 3', c.

A multiplicity of flaps or valve units may be disposed side-by-side (FIGS. 14–16) and use common contact walls 3'. A multiplicity of valve units or flaps may be superimposed and used common end walls 9, 10 (FIGS. 20 and 21).

Preferably, the flaps of the dihedron shapes (FIG. 4) are in the form of two specific surfaces joined together at a central support wall b FIG. 7). Preferably, a prolonged central wall together with a half-flap forms a semi-dihedron which can be associated with another semi-dihedron to form a valve (FIG. 12) in which the slot-forming detachment of the individual flaps during opening takes place from a center towards a periphery of the valve, i.e. from a contact wall LL towards a support wall for a half-flap.

The slot-forming detachment of the individual flaps during opening, takes place by movement from the periphery towards the center of each dihedron (FIGS. 1, 2, 14, 15, 23). A side-by-side arrangement of a plurality of flaps a associated with support walls b and contact walls c of small width as compared with a length traveled by the fluid 2 within the body 4, may be provided to give the fluid a maximum flow cross-section (FIG. 15). The flaps a may have their edges in direct contact with each other (FIGS. 22 and 23).

I claim:
1. An automatic valve for controlling gas passage through a duct, such as a feed duct of a two-stroke internal combustion engine, comprising
   a chamber communicating with said duct and arranged to determine opening and closing of said duct,
   at least one dihedron-shaped flap situated in said chamber and mounted to move towards or away from an inner contact surface of said chamber,
   said flap thereby opening or closing rectangular slot-shaped flow ports defined between the same and said inner contact surface of said chamber,
   said flap comprising edges arranged substantially parallel to the flow which are arranged to graze, when in movement, flat surfaces of recesses provided in end walls parallel to said edges of said at least one flap and perpendicular to said contact surface of said chamber, and
   a support wall positioned between dihedral wings of said at least one dihedral-shaped flap and downstream of an edge joining said wings to form said dihedral flap in said flow direction,
   said support wall having at least one flat, smooth surface.
2. The valve of claim 1, wherein support wall is formed of metal.
3. The valve of claim 1, wherein said support wall is strip-shaped.
4. The valve of claim 1, wherein said support wall is spaced from said wings of said at least one flap in unstressed state.
5. The valve of claim 1, wherein said recesses are formed by
   seats provided in said end walls for supporting sides of said at least one flap at said edges thereof parallel to the flow,
   said seats arranged to limit transverse deformation of said parallel edges of said flap caused by pressure on an inside of said at least one dihedron-flap which determines valve closure,
   whereby transverse seepage is minimized or prevented.
6. The valve of claim 2, wherein said contact surface is formed by strip-type contact walls, with said edges of said at least one flap perpendicular to the flow resting against said strip-type contact walls.
7. The valve of claim 6, wherein said strip-type contact walls are formed of metal.
8. The valve of claim 7, wherein said support wall is identical to said strip-type contact walls
9. The valve of claim 1, additionally comprising
   a multiplicity of flaps disposed side-by-side and using common contact walls, forming said contact surface of said valves.
10. The valve of claim 1, additionally comprising a multiplicity of flaps superimposed on one another and using common end walls forming said end walls containing said recesses.
11. The valve of claim 1, wherein said at least one flap of said dihedron shape is in the form of two specific surfaces joined together at a central common support edge.
12. The valve of claim 1, wherein said movement of said edges of said at least one flap during opening, takes place by movement from a periphery towards a center of said dihedron-shaped flap.
13. The valve of claim 1, additionally comprising
   a plurality of flaps arranged side-by-side to one another and associated with respective support walls and contact walls of small width as compared with a length travelled by gas in the flow within said chamber, thereby providing said gas flow with a maximum flow cross-section.
14. The valve of claim 1, additionally comprising
   a plurality of flaps having said edges thereof perpendicular to the flow in direct tight contact with one another.
15. The valve of claim 1, wherein said dihedron-shaped flap is formed by two wings flaring away from one another in unstressed state and joined about a curved edge thereof.
16. The valve of claim 1, wherein said at least one flap is folded to form a substantially V-shaped dihedron.
17. The valve of claim 1, wherein said recesses provided in said end walls flare in a direction away from the incoming gas flow into the chamber.
18. The valve of claim 1, wherein said recesses taper in a direction away from the incoming gas flow into said chamber.
19. The valve of claim 1, wherein said support wall is fixed in said chamber so that said support wall cannot slide axially.
20. The valve of claim 19, wherein said support wall is affixed to seats within said end walls of said chamber by welding.
21. The valve of claim 19, wherein said support wall is affixed in said chamber by blocking plates fixed to said valve with screws.

* * * * *